United States Patent
Reilly (10) Patent No.: US 7,536,433 B2
(45) Date of Patent: May 19, 2009

(54) SYSTEM AND METHOD FOR CUSTOMIZING A PORTAL ENVIRONMENT

(75) Inventor: Thomas Reilly, Somerville, NJ (US)

(73) Assignee: JPMorgan Chase Bank, N.A., New York, NY (US)

(*) Notice: Subject to any disclaimer, the term of this patent is extended or adjusted under 35 U.S.C. 154(b) by 684 days.

(21) Appl. No.: 10/671,022

(22) Filed: Sep. 25, 2003

(65) Prior Publication Data

US 2004/0230441 A1    Nov. 18, 2004

Related U.S. Application Data

(60) Provisional application No. 60/413,795, filed on Sep. 25, 2002.

(51) Int. Cl.
G06F 15/16 (2006.01)
G06F 17/00 (2006.01)

(52) U.S. Cl. .................. 709/202; 709/217; 709/224; 709/246; 715/208; 715/234

(58) Field of Classification Search ............... 709/217, 709/245, 202, 224, 246; 715/513, 517–525, 715/221, 224, 234, 253, 208, 237, 250
See application file for complete search history.

(56) References Cited

U.S. PATENT DOCUMENTS

| | | | |
|---|---|---|---|
| 5,598,557 A | 1/1997 | Doner | |
| 5,602,936 A | 2/1997 | Lynn | |
| 5,603,025 A | 2/1997 | Tabb | |
| 5,675,637 A | 10/1997 | Szlam | |
| 5,715,450 A | 2/1998 | Ambrose | |
| 5,784,058 A * | 7/1998 | LaStrange et al. | 715/738 |
| 5,794,178 A | 8/1998 | Caid | |
| 5,862,323 A | 1/1999 | Blakley et al. | |

(Continued)

FOREIGN PATENT DOCUMENTS

WO    WO 01/18656    3/2001

(Continued)

*Primary Examiner*—David Lazaro
(74) *Attorney, Agent, or Firm*—Hunton & Williams (57) ABSTRACT

A system and method for creating a customized portal environment website that retrieves content from external websites and presents this content with a consistent and controlled look and feel. Three features of this invention that enable the consistent look and feel are clipping, scrubbing and link behavior tools. The clipping tool identifies the structure of clipped pages. The structure of the clipped content is stored in a database in the system. As the system dynamically retrieves clipped pages from the target site, the system compares the structure of the retrieved clip to the anticipated, stored structure of the clip. If the two structures match, the clipped page is rendered in the look and feel of the custom website. If the structures do not match, the dynamically clipped page is displayed in a new separate window. The scrubbing feature of the present invention allows the designer of the website to define a global structure for all pages that are retrieved from a particular domain. If a requested page does not conform to the defined structure, the system opens a new window for the page. The link behavior tool of the present invention traps a request for the embedded link upon it's execution and redirecting the request to a page that has already been approved and clipped or by opening a new window for the embedded link.

20 Claims, 5 Drawing Sheets

U.S. PATENT DOCUMENTS

| | | | |
|---|---|---|---|
| 5,918,238 A | 6/1999 | Allen et al. | |
| 5,918,239 A | 6/1999 | Allen et al. | |
| 5,926,812 A | 7/1999 | Hilsenrath | |
| 5,933,823 A | 8/1999 | Cullen | |
| 5,933,827 A | 8/1999 | Cole | |
| 5,970,483 A | 10/1999 | Evans | |
| 5,987,454 A | 11/1999 | Hobbs | |
| 6,014,638 A | 1/2000 | Burge et al. | |
| 6,026,398 A | 2/2000 | Brown et al. | |
| 6,032,147 A | 2/2000 | Williams et al. | |
| 6,052,730 A * | 4/2000 | Felciano et al. | 709/225 |
| 6,065,120 A | 5/2000 | Laursen et al. | |
| 6,112,181 A | 8/2000 | Shear et al. | |
| 6,134,592 A | 10/2000 | Montulli | |
| 6,151,584 A | 11/2000 | Papierniak | |
| 6,154,750 A | 11/2000 | Roberge et al. | |
| 6,170,011 B1 | 1/2001 | Beck et al. | |
| 6,182,142 B1 | 1/2001 | Win et al. | |
| 6,266,683 B1 | 7/2001 | Yehuda et al. | |
| 6,298,356 B1 | 10/2001 | Jawahar et al. | |
| 6,363,381 B1 | 3/2002 | Lee et al. | |
| 6,401,125 B1 | 6/2002 | Makarios et al. | |
| 6,449,765 B1 | 9/2002 | Ballard | |
| 6,453,353 B1 | 9/2002 | Win et al. | |
| 6,460,141 B1 | 10/2002 | Olden | |
| 6,487,641 B1 | 11/2002 | Cusson et al. | |
| 6,510,523 B1 | 1/2003 | Perlman et al. | |
| 6,526,404 B1 | 2/2003 | Slater et al. | |
| 6,539,424 B1 | 3/2003 | Dutta | |
| 6,557,039 B1 | 4/2003 | Leong et al. | |
| 6,584,508 B1 | 6/2003 | Epstein et al. | |
| 6,589,291 B1 | 7/2003 | Boag et al. | |
| 6,609,198 B1 | 8/2003 | Wood et al. | |
| 6,618,579 B1 | 9/2003 | Smith et al. | |
| 6,675,261 B2 | 1/2004 | Shandony | |
| 6,684,384 B1 | 1/2004 | Bickerton et al. | |
| 6,718,535 B1 | 4/2004 | Underwood | |
| 6,725,269 B1 | 4/2004 | Megiddo | |
| 6,738,779 B1 | 5/2004 | Shapira | |
| 6,751,654 B2 | 6/2004 | Massarani et al. | |
| 6,754,833 B1 | 6/2004 | Black et al. | |
| 6,763,388 B1 * | 7/2004 | Tsimelzon | 709/228 |
| 6,810,395 B1 | 10/2004 | Bharat | |
| 6,847,991 B1 | 1/2005 | Kurapati | |
| 6,892,231 B2 | 5/2005 | Jager | |
| 6,925,481 B2 | 8/2005 | Singhal et al. | |
| 6,965,939 B2 | 11/2005 | Cuomo et al. | |
| 6,976,210 B1 * | 12/2005 | Silva et al. | 715/513 |
| 6,983,421 B1 | 1/2006 | Lahti et al. | |
| 7,010,512 B1 | 3/2006 | Gillin et al. | |
| 7,089,208 B1 | 8/2006 | Levchen et al. | |
| 7,203,909 B1 * | 4/2007 | Horvitz et al. | 715/765 |
| 2002/0054090 A1 * | 5/2002 | Silva et al. | 345/747 |
| 2002/0174010 A1 | 11/2002 | Rice | |
| 2002/0191548 A1 | 12/2002 | Ylonen et al. | |
| 2003/0001888 A1 | 1/2003 | Power | |
| 2003/0037131 A1 | 2/2003 | Verma | |
| 2003/0084345 A1 | 5/2003 | Bjornestad et al. | |
| 2005/0021862 A1 * | 1/2005 | Schroeder et al. | 709/246 |

FOREIGN PATENT DOCUMENTS

| | | |
|---|---|---|
| WO | WO 02/17082 | 2/2002 |

* cited by examiner

SYSTEM AND METHOD FOR CUSTOMIZING A PORTAL ENVIRONMENT

CROSS REFERENCE TO RELATED APPLICATIONS

This application claims priority to U.S. Provisional Application No. 60/413,795, entitled WORKPLACE FINANCIAL SERVICES GATEWAY filed on Sep. 25, 2002, the entirety of which is incorporated herein by reference.

FIELD OF THE INVENTION

The present invention generally relates to systems and methods for customizing a portal environment, and more particularly to systems and methods for clipping, scrubbing and link rendering.

BACKGROUND OF THE INVENTION

It is a common business practice for suppliers of services and products to create a business relationship with corporations such that the supplier caters to employees of the corporations by providing special customized offerings to the employees. For example, in the area of financial services, the employees are offered special deals in banking, credit cards, home equity, insurance and investments. Depending on the size of the corporation and other factors, the corporation negotiates with the supplier to provide different offerings and pricing with respect to these products and services. The contracts with the corporations may, for example, include deferred fees or lower minimum balances, or certain amount of money back on a home equity deal.

Historically, these offerings began as paper-based information for the employees, evolved to providing information via CD-ROMS, further evolved to providing the information on the corporation's intranets, and then to a static website accessed on the Internet.

A next step in the evolution of these offerings is a portal product that is capable of providing customized websites for each corporation. Unfortunately, the prior art portal environments suffer from several drawbacks that limit their usefulness. Specifically, these portal environments provide unsatisfactory methods of importing information from external sites and presenting a cohesive customer experience.

Some options to solve this problem that have been rejected by the present inventors include: creating a normalized data store between the external sites that would allow for a middleware layer to access appropriate content and applications; frame the external content; or "pop up" the external content in a new browser window. Each of these options were deemed unattractive for a variety of reasons. The normalized data store is a huge project that would consume many resources over a long period. The second and third options result in a poor user experience.

One prior art portal creation tool is known as Epicentric by Vignette Inc. One of the limitations of the prior art portal creation tools such as Epicentric is that they only allow one chrome to be defined per page. The chrome is that part of the application window that lies outside of a window's content area. Toolbars, menu bars, progress bars, and window title bars are all examples of elements that are typically part of the chrome. Given the prior art's concept of a page, one is limited to having a single look-and-feel wrap around each of the modules on that page. This considerably limits one's creativity in designing a site. Also, this limitation prevents developers from designing a website site according to the selected composite.

Additional problems with the prior art include unsatisfactory clipping methodology, insufficient scrubbing capability and the inability to control embedded links in content retrieved from external sources.

SUMMARY OF THE INVENTION

The present invention is a system and method for providing customized portal environment websites. A supplier of products and/or services has several corporate customers with hundreds or thousands of employees that are actual or potential customers of the supplier themselves. For each corporate customer, the supplier creates a customized website on one or more of its servers. The employees of the corporate customer can logon to the website, preferably thought the public Internet.

The website presented to the employee is a portal environment that is customized for each corporate customer. The customization includes inserting the appropriate pricing information established for the particular corporate customer, branding the site with the corporation's logo and displaying only the products and deals for which the particular corporate customer has contracted. In the preferred embodiment of a supplier of financial products and services, a particular corporate customer contract might include: 1 year deferred fees, $3,000 minimum balance after the first year, $500 back on closing a home equity loan, no credit card deal, $1 ATM rebate up to the first three transactions and $15 international transfer fee with two transfers per month included.

In the preferred embodiment, the supplier itself is a large corporation with several lines of business. Each line of business has it's own website on which its particular products and services are described and offered. Each customized website of the present invention represents a portal environment to the other lines of business. The website it self is not owned or maintained by any particular LOB offering products and services itself (it simply bundles them). Furthermore, the administrator of the website is not in the content-creation business, but rather obtains the information to display to the user from the other lines of business' websites.

As previously stated, the prior art suffered from the problem that it does not allow a page to have more than one chrome (i.e., "look-and-feel") associated with the modules on it. To solve this problem, the "look-and-feel" is embedded in the Hypertext Markup Language (HTML) for each module, rather than in a separate chrome which is then independently associated with each module instance.

To solve the problem of limitations from the prior art's layout options (i.e.—spacing, number of layout options, etc.), employs its own layout scheme through nested Java Server Pages (JSPs). The present invention uses the prior art's basic structure of having a main JSP representing the whole page (e.g.—index.jsp) and the template that wraps it, along with how modules are placed on the prior art pages. Instead of having the layout defined within a single page, the present invention defines the layout by a number of pages, each representing a section of a single webpage. In other words, the novel nested JSP structure, with JSPs for the left and right navigation sections, and middle content section, are to the traditional prior art pages using the prior art page's identifiers.

Three significant tools of the present invention are the clipping, scrubbing and link behavior tools. The clipping tool allows the designer of a custom website to identify content contained on an external site that is to be imported and rendered in the look and feel of the custom website. This tool stores the structure of the clipped content in a database in the system. As the system dynamically retrieves clipped pages from the target site during an end-user session, the system compares the structure of the retrieved clip to the anticipated, stored structure of the clip. If the two structures match, the clipped page is rendered in the look and feel of the custom website. If the structures do not match, the dynamically clipped page is displayed to the end-user in a new separate window, and an email is then sent to a content administrator identifying the page that needs to be re-clipped. As a result of this feature, only fresh content is displayed to the end user and the system is able to maintain a consistent look and feel of the custom website, even though the content from the target page is dynamically evolving.

The scrubbing feature of the present invention allows the designer of the website to define a global structure for all pages that are retrieved from a particular domain. Even though a particular page has not been previously clipped, using the global definition of the structure, the system is able to render the clipped page for the custom website. If the requested page does not conform to the defined structure, the system opens a new window for the page as described above.

The link behavior tool of the present invention allows the designer to customize the user experience to a vast degree and allows the administrator control over how embedded links within a clip behave. As appreciated, since the system is rendering the pages in the custom site in a specified look and feel, activation of an embedded link in a clipped page would disrupt this carefully designed look and feel. The link behavior tool of the present invention solves this technical problem by trapping the request for the embedded link upon it's execution and redirecting the request to a page that has already been approved and clipped or by opening a new window for the embedded link.

Encrypted Secure Sockets Layer (SSL) sessions that are generated by clipped pages (i.e., a credit card application) are managed by the system of the present invention. Clipped SSL pages generate a cookie, which is passed to the system and managed while that page is being used in the custom website. These cookies are passed back when the page is exited by the user (i.e., when a credit card application is submitted).

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
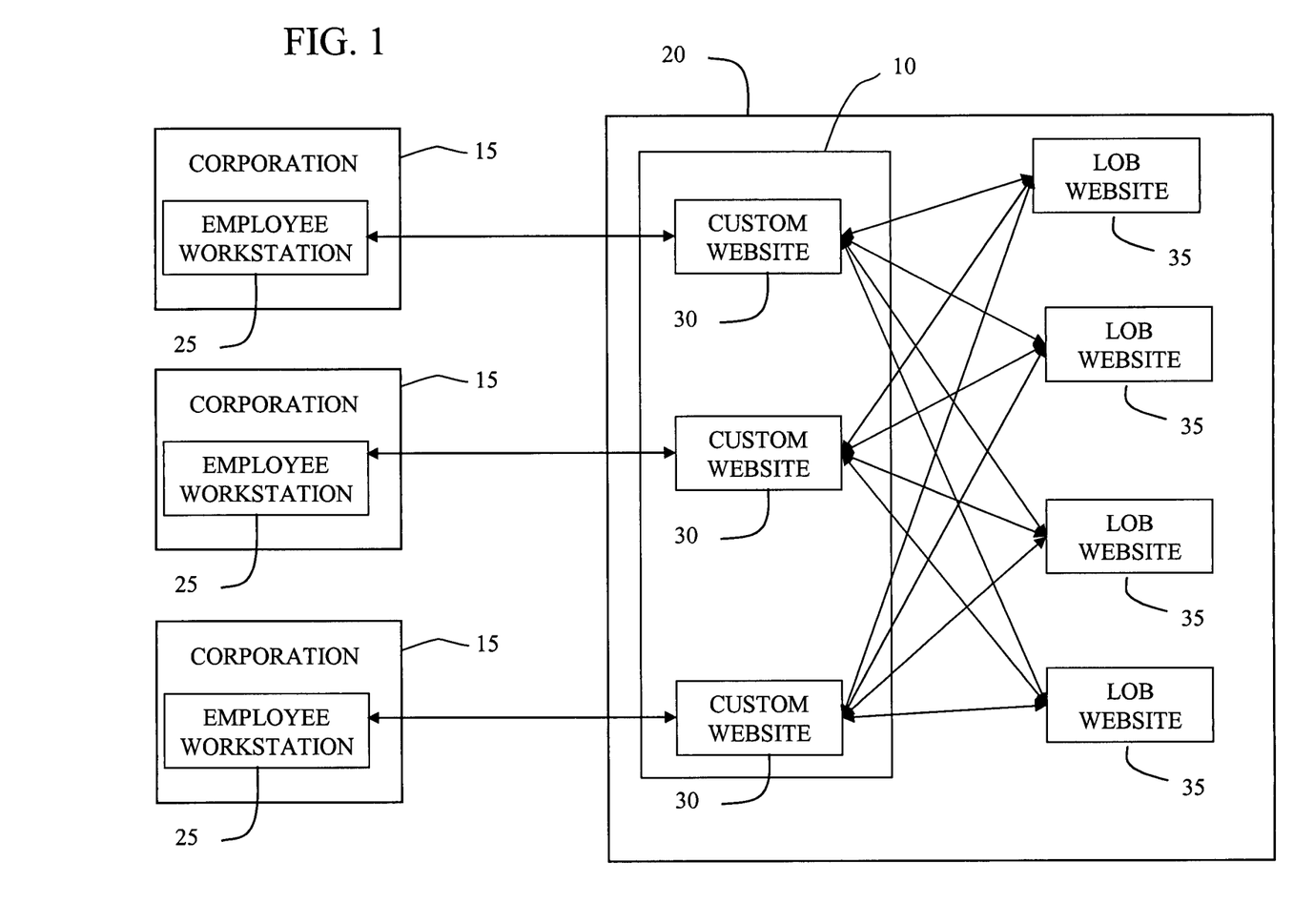
FIG. 1 illustrates the operation of the system of the present invention.

FIG. 1 illustrates the operation of the system 10 of the present invention. Elements 15 represent corporate customers of the supplier 20 of products and/or services. Although there are three corporate customers 15 illustrated in this Figure, it is appreciated that the system and method of the present invention can be extended to as many corporate customers as can be accommodated by the facilities (hardware and software) of the supplier 20. In each corporate customer 15, there is at least one employee workstation 25. Although only one employee workstation 25 is illustrated in this Figure, it is appreciated that as many employee workstations 25 can exist as can be accommodated by the facilities (hardware and software) of the corporate customers 15. In the preferred embodiment, employee workstation 25 operates a web based browser application. This application preferably uses browsers that support Java applets and JavaScript such as Netscape 4.x or Internet Explorer 4.x.

The employee workstations 25 connect to system 10 within supplier 20 through an appropriate electronic connection. In the preferred embodiment, this connection is through the public Internet, but can be accomplished though a dial-up connection or a Virtual Private Network (VPN). Although not specifically illustrated in this Figure, system 10 is implemented using a distributed client/server architecture. The architecture consists of at least one application server communicating with at least one application database, and at least one database server communicating with at least one database.

For each customer corporation 15, the system of the present invention provides a unique customized website 30. Each website 30 is a portal environment that is customized for each customer corporation 15. In a preferred embodiment, the customization includes inserting the appropriate pricing information for each customer corporation 15. For example, if the supplier 20 is a financial services provider, a particular customer corporation 15 might negotiate the following deals for its employees: 1 year deferred fees, $3,000 minimum balance after the first year; $500 back on closing a home equity loan; no credit card deal; $1 ATM rebate up to the first three transactions; and $15 international transfer fee with two transfers per month included. In this particular example, the website 30 for customer corporation 15 would present its employees with the credit card pricing information that is available to the general public. If a different corporate customer 15 was able to negotiate a special deal on credit cards (e.g., an introductory rate of 3%), the credit card information on the website 30 for that corporate customer 15 would reflect the pricing of that deal. The websites 30 further include the corporate logo of the particular corporate customer 15.

The websites 30 are company-driven. Each corporate customer 15 may select their own blend products and services to make available to their employees on their customized website 30. System 10 maintains a company profile for each corporate customer 15. The company profile section contains information about the company such as any special pricing deals being offered to the employees of the corporate customer 15 or custom sign-up instructions. When a particular corporate customer's website 30 is being rendered, system 10 makes decisions based on the information contained in the company profile. For example, if only certain products are included in the company's profile, only certain tools that have been associated with those products will show up on the website 30. The company profile is an additional driving force behind the site's 30 business logic.

Information regarding the corporate customer's particular pricing plan is output within the company's website 30 through the use of dynamic text tags. These dynamic text tags (e.g.—[@(company_name@], [@(waiver_period@], are embedded in the text to be displayed on a website 30. When a module on the website 30 is in the process of being displayed, it checks to see if any of these known tags existed within the text it contained. If so, it looks up the information referred to in the tag and inserts it in place of the tag in the text block being rendered. This results in a truly customized website 30 for the corporate customer 15. These tags allow sentences such as "As an employee of XYZ Corporation, you have free checking for 3 years."

Because system 10 does not own any products or provide any services itself, and is not in the content creation business, the websites 30 obtain the product and/or service information from the websites 35 of the lines of business within the supplier 20. Although connections to obtain and import content into websites 30 have only been illustrated with respect to internal LOB websites 35, it is appreciated that content can be extracted from other websites external to the supplier 20. For example, there are many calculators for financial products that are available on the public Internet. Links to these publicly available calculators can be established and can be displayed on websites 30 as appropriate (e.g., as they relate to certain products such as a mortgage calculator in relation to the mortgage LOB).

The most significant problems associated with the prior art relate to how the product information is retrieved from the LOB websites 35 and how this information is presented on the custom website 30. One of these problems is that the prior art portal development tools is that they do not allow a webpage 30 page to have more than one chrome (i.e.—look-and-feel) associated with the modules on it. A module is a separate display area on the website 30. Additionally, any solution to this problem has to be simple to manage on the administrative end once coding of the website 30 is complete. In order solve this chrome problem and at the same time to provide simplicity of administrating system 10, the present invention embeds the look-and-feel in the HTML for each module, rather than in a separate chrome which would then be independently associated with each module instance.

This approach is facilitated when each module appears in a relatively fixed place on the site 30, always with the same look-and-feel. In this instance, there is no real purpose is allowing the content administrator to be able to select chromes that didn't apply for a particular module. Therefore, the present invention employs a single chrome that applies for all modules—an "empty chrome." This methodology adds nothing to the HTML and just calls the module's display method. This "empty chrome" is applied to the modules on almost every page in system 10. One exception to this general rule is a "transparent corners" chrome that is used to handle the rounded corners around some modules. As a result of this feature of the present invention, it is not necessary to remember which chrome has to be applied to which modules/pages, and therefore it is much easier to create the desired look-and-feel.

To solve the problem of limitations of the prior art's layout options (i.e., spacing, number of layout options, etc.), the present invention employs a custom layout scheme using nested JSPs. The prior art had a basic structure of having a main JSP representing the whole page (e.g.—index.jsp) and a template that wraps it. In the present invention, instead of having layout defined within a single page, the layout is defined by a number of pages, each representing a section of a single webpage. In other words, the novel nested JSP structure, with JSPs for the left and right navigation sections, and middle content section, are mapped to the prior art's pages using the page's identifiers. When these JSPs loaded on a webpage in site 30, they call various prior art methods to pull the modules that should be displayed on the page to which it is mapped. The mapping is accomplished by taking the page ID assigned to an prior art page and inserting it in a properties file from which the JSP reads. Note that this solution also eliminates the limitation of having a single look-and-feel for all the chromes on a web page, because now each web page is divided into a number of prior art pages.

As previously described, a webpage designer using the prior art portal development tool was quite limited when trying to define the spacing between modules. This problem is primarily due to the fact that the prior art tool had HTML line breaks, paragraph tags, and table tags built into one of the methods that had to be called whenever a module needed to be displayed. While this does not present a problem if one wanted to add to that spacing and create a very large space around a module, such is not the case for a customized design. The prior art did not allow the modules to be placed close enough together to meet certain look-and-feel requirements. To solve this problem, the display routines of the prior art were stripped of all of its HTML code, and just used to call the methods needed to actually display the modules. Also, since each module is different, the look and feel spacing is added either inside the module or within the custom nested JSPs as described above. This allows the webpage designer complete control over the creative design of the site 30.

As briefly described above, the system 10 of the present invention clips and renders content from the external sites 35. The custom rendering tools of system 10 are clipping, scrubbing and link rendering. These three tools work together to bring in static content, applications, forms, calculators and other page elements into modules that then renders them into the desired look and feel.

The clipping tool of system 10 allows a webpage 30 designer to 'clip' an external web page on certain tags, create a module, and render the module in the desired look and feel. A tag may be: <table>; <tr>; <td>; <body>; or <form>. A module may consist of multiple clips. A module may consist of clips of different tags.

When the designer requests to see all clips of a certain tag, system 10 returns all 'top-level' (non-nested) clips of that tag on the target page. The user may then 'drill-down' within any clip to get clips within that clip. For example, a user may initially request to clip on table and all non-nested top-level tables are returned to satisfy the request. The user may then request to drill down within one of the tables, and see all forms within that table. The user may then drill down within one of the forms and see all tables within the form. The user may then request to drill down within a table and see all rows within that table. At any time, the user may 'drill back up' from a clip to get the 'parent' clip. In this way, the user can pick and choose which pieces of the original HTML they wish to extract for their module.

Figure 2:
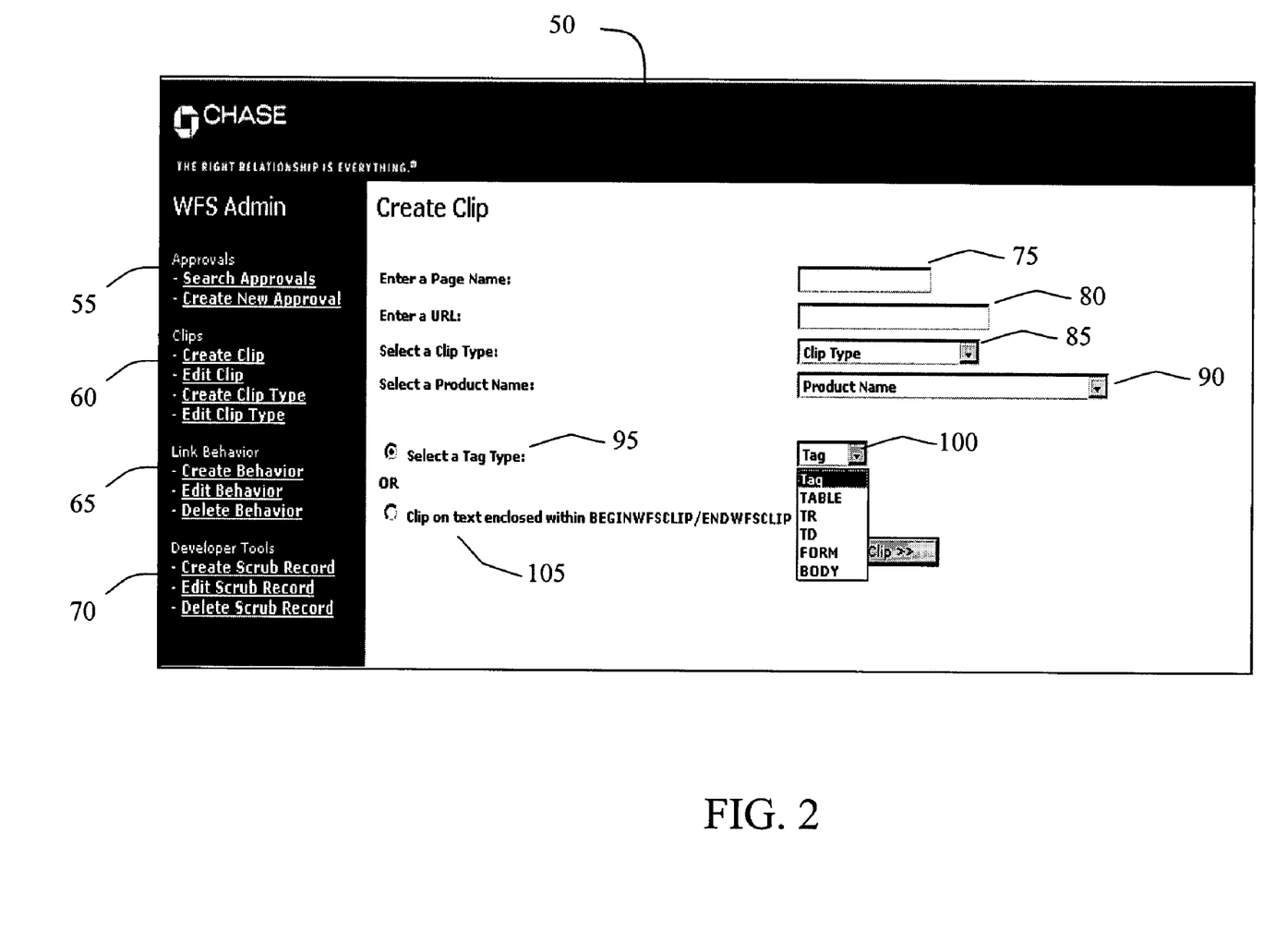
FIG. 2 depicts a user interface for creating a clip.

FIG. 2 illustrates the webpage designer interface 50 for creating a clip. This interface 50 and the interfaces illustrated in the other figures are designed with respect to the preferred embodiment of a supplier of financial services. Some of the description contained herein is made in terms of the user interface screens (e.g., input screens) illustrated in the Figures. Further description herein relates to the processing of the information illustrated in these screens by the hardware components of system 10 as previously described. As appreciated to those skilled in the art, the description of these screen and the accompanying description of the processing allows one to make and use system 10.

On the left side of interface 50 is a menu of the tools available to the designer. These tools include Approval tools 55, Clip tools 60, Link Behavior tools 65 and Scrub tools 70. The interface 50 is displayed in response to the activation of the "Create Clip" tool in area 60. Once a clip is stored in association with a webpage on site 30, it can be edited and at any time the user may select to add/remove a clip to their module using the tools in area 60.

In area 75 of interface 50, the designer is asked to name the page to which the clip will be added. In area 80, the designer is asked to identify the Uniform Resource Locator (URL) of the site from which the clip is to be retrieved. In area 85, the user is asked to identify the type of clip in question. Area 85 has a drop down box that provides the designer with a list of the types of types of clips that can be identified. In area 90, the user can input the Product Name associated with the content contained in the clip.

Interface 50 provides the user with two radio buttons 95 and 105 for specifically identifying the content that is to be clipped. If radio button 95 is selected, the designer uses box 100 to identify the specific tag type for system 10 to search for in the target page. As previously described, these tag types include Tag, Table, TR, TD, Form and Body. Alternatively, the designer can select radio button 105 and identify the clip by defining identifiers that enclose the desired content.

Once part of a page in a site 30, the integrity of the clip is always maintained. In other words, only fresh content is always displayed. The page in site 30 will actively retrieve the content from the external site 35, and will not display static content stored in site 30 as some prior art system did.

Figure 3:
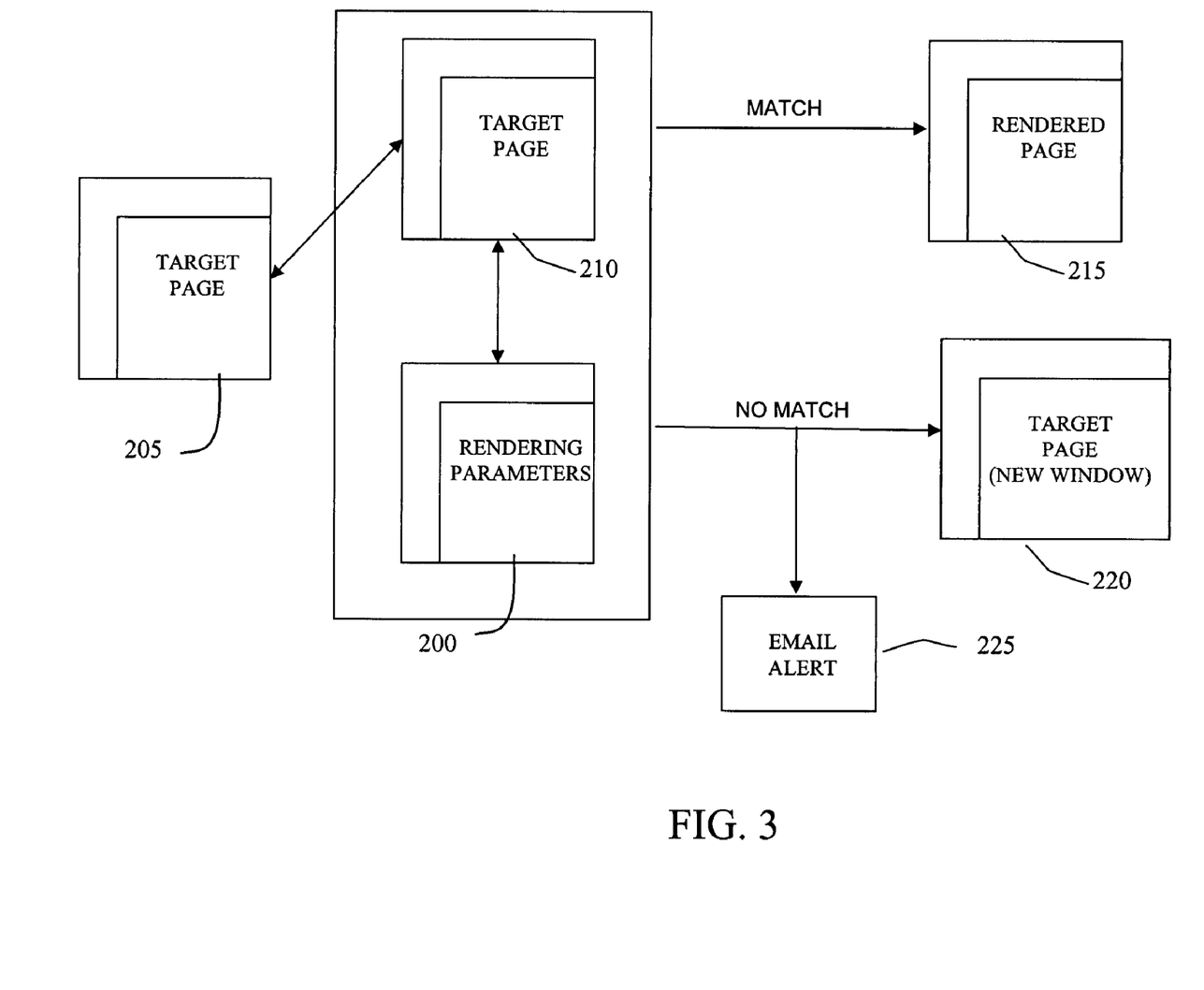
FIG. 3 illustrates a clip structure comparison operation.

A significant feature of the present invention is that if the structure of the clipped content changes, then the clip is not executed by site 30. This significant technical advantage of the present invention is illustrated in FIG. 3. When the content (page) is initially clipped as described above with respect to FIG. 2, the structure 200 of the clipped module (the number and order of html tags of the clipped module) is saved to a database in system 10. At run-time, when the employee, (using workstation 25, FIG. 1) requests to view the clipped content, the page 205 is dynamically retrieved from the target site (e.g., LOB site 35, FIG. 1). The content 205 is clipped according to the formula specified, and brought into system 10 as clipped content 210. The structure of this dynamically clipped page 210 is compared to the structure 200 stored in the database. If the structure of the dynamically clipped page 210 is not changed, the clipped page 210 is shown to the employee as a rendered page 215 with the desired look and feel. If comparison of the structure of dynamically clipped page 210 does not match the anticipated structure 200 stored in the database, the external page 210 is not rendered, but is rather opened in a new window 220 for presentation to the user. Simultaneous with the opening of the new window 220 for the unmatched page 210, system 10 sends an alert 225, preferably an email, to the administrator. The purpose of the alert 225 to notify the administrator that the structure of the target page 205 has changed and the page 205 should be re-clipped and new structure of the page should be stored in the database for future comparisons.

The process illustrated in FIG. 3 ensures that the content of the clipped module is always fresh, while simultaneously ensuring that the structure (table, row, <td> or form) of the clipped module has retained its integrity since the time of the clip. This is a distinct technical advantage of the system 10 of the present invention over the prior art.

Once a page has been clipped, it may be sent out for approval to the target site's administrator (e.g. LOB site 35) before being published on the website. This approval process can be initiated with the tool sin area 55 of interface 50. This approval process allows the target site owners to look at how the clipped page looks in the look and feel of custom site 30, and gives them the opportunity to approve or disapprove the rendering. Approvals can be created for each clip once the target page administrator is specified, and automatic email requesting approval can be sent out.

When creating a custom website 30 (FIG. 1) it is not efficient (and may not be possible) to clip all of the pages on a particular site (e.g., LOB site 35) because of two reasons. First, not all pages of the target site can be documented (some may be missed). Second, the list of pages on the external site is constantly changing as the site itself is evolving.

Figure 4:
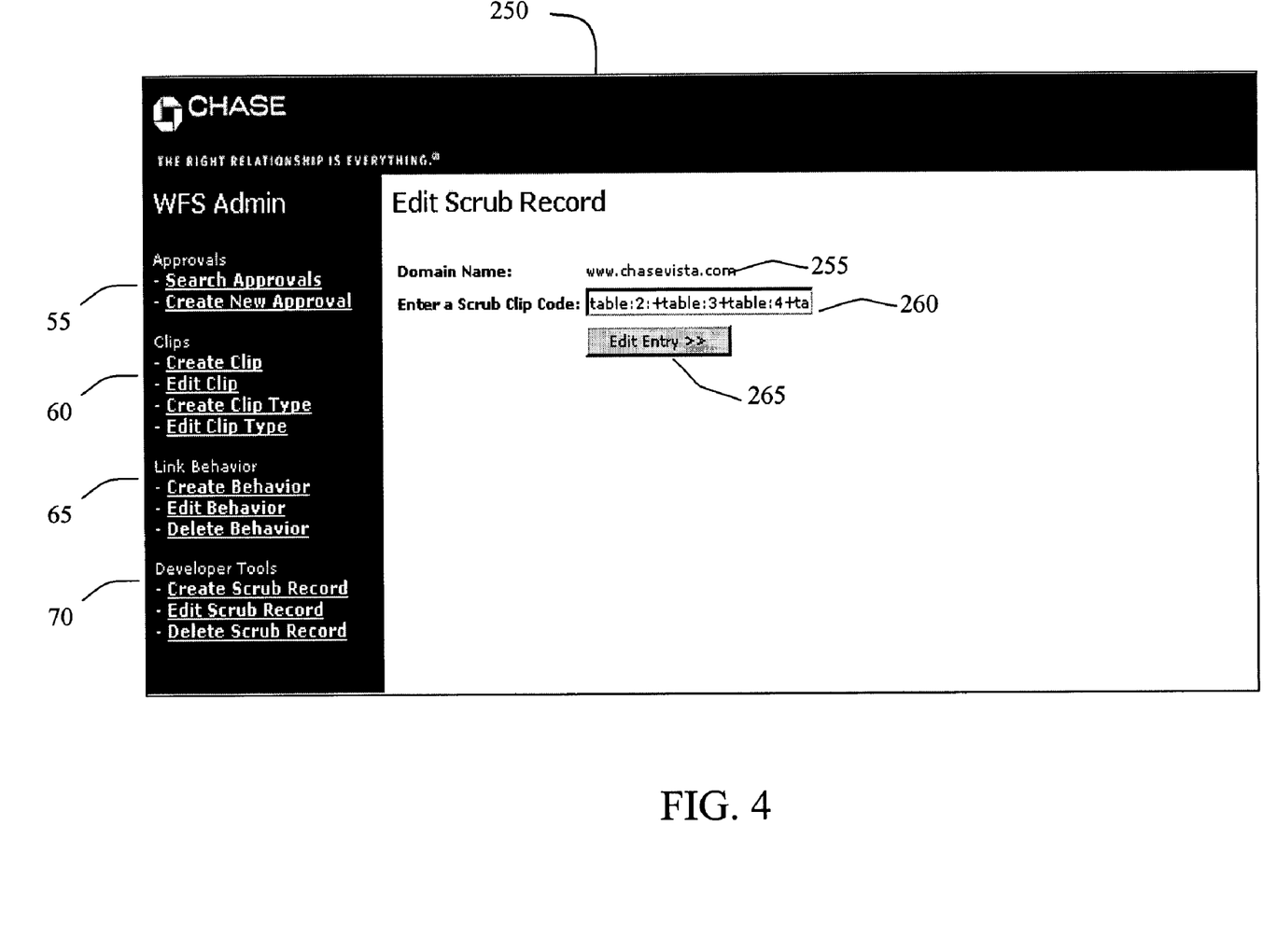
FIG. 4 is a user interface for editing a scrub record.

The scrubbing tool of the present invention allows the designer to specify a default clipping/scrubbing formula to be used on all pages of a particular domain (e.g., LOB site 35). A user interface 250 of this scrubbing tool is illustrated in FIG. 4. The specific interface 250 illustrated in FIG. 4 relates to editing an existing scrub record. The Create Scrub Record choice in area 70 of the designer interface allows the designer to specify the default formula for the structure of all pages that are retrieved from a target domain (site). This includes pages from the target site that have not been specifically clipped into custom site 30.

In area 255 of the interface 250, the user enters the domain name of the target website from which content will be clipped. Area 260 contains the formula (structure) of the clipped content. This formula can be edited by the user in area 260 to enter changes or correct defects in the structure of the clipped data. When the editing is complete, the designer selects button 265 to save the edited scrub clip code.

The global definition of this formula allows all of the pages from that domain to be rendered in the look and feel of custom site 30. For example, a designer may request to clip the second table of all pages on mortgage02.chase.com (a LOB site 35) and render them in the look and feel of custom site 30. Any time the employee using workstation 25 (i.e., the end-user) requests any mortgage02.chase.com page, the page is clipped automatically on the second table, and the result is rendered in the look and feel of site 30. As the end-user navigates through the pages of the target domain, each page from the domain is actually being clipped and rendered by system 10 into site 30. This clipping process proceeds according to the formula defined in system 10 for that domain.

As described above with respect to FIG. 3, if the requested page breaks from the template of the site 30 and does not fit the general formula (e.g., a page on mortgage02.chase.com may not have table 2 for example), then that page is presented to the end-user in a separate window 220. When the administrator receives the alert 225 that the page could not be rendered, the administrator can decide to clip that page individually and override the generic scrubbing formula.

The link behavior tool of the present invention allows the designer to customize the user experience to a vast degree and allows the administrator to control how embedded links within a clip behave. As appreciated, since system 10 is rendering the pages in custom site 30 in a specified look and feel, activation of an embedded link in a clipped page would disrupt this carefully designed look and feel. More importantly, as described above, the corporate clients 15 have negotiated certain deals for their employees. A page on a LOB site 35 most likely has a link to another page that contains pricing that is inconsistent with the pricing negotiated by the corporate client 15. This inconsistency could endanger the entire relationship with the corporate client. The link behavior tool of the present invention solves this technical problem by trapping the request for the embedded link upon it's execution and redirecting the request to a page that contains the correct pricing for the employee of the particular corporate customer 15.

Figure 5:
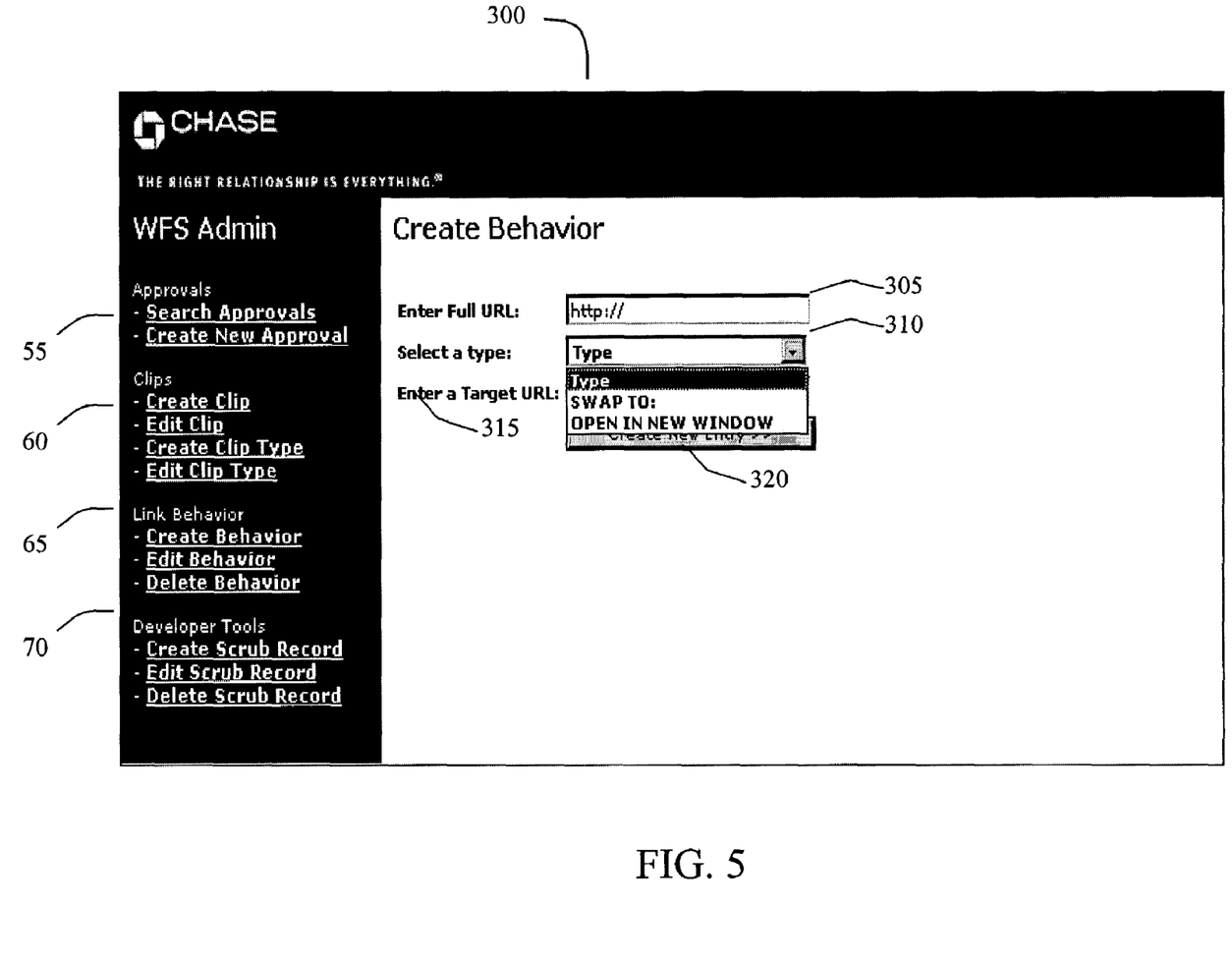
FIG. 5 illustrates a user interface for creating a behavior.

FIG. 5 illustrates the user interface 300 for creating link behaviors. In area 305, the tool allows the designer to enter the URL of the link that is to be trapped. In area 310, the user can then define whether the trapped URL should be opened in a separate window for display to the end-user or whether the trapped URL should be swapped to a different URL (e.g., one that contains the proper pricing content for the employee associate with a particular corporate customer 15. For example, there may be a certain page on the mortgage02 site that should not be scrubbed/rendered in the look and feel of custom site 30, rather but opened in a new window). In area 315, the designer can define the alternative URL that the trapped URL should be 'swapped' with. Once the designer has completed input into areas 305, 310, and 315, the designer can select button 320 to create the actual link behavior.

Using the link behavior tool of the present invention, the designer may request that whenever a page has URL1 on it, that URL1 should be replaced with URL2. For example, the mortgage site (i.e., a LOB site 35) may have a special deal for first time customers, and may have some links scattered within the text of their site, text that has now been clipped. System 10 would like the employee user to go to the special mortgage deal that is available to their company 15 instead of the generic deal on mortgage pages. This tool will allow the designer to redirect all clicks to a specific URL to a different URL. That is to say, any instance on mortgage02.chase.com/first_time_customer can be redirected to wfs.chase.com/special_mortgage_deal so that the user always sees the deal that is relevant to them.

Summarizing the operation of the clipping, scrubbing and link behavior tools, whenever a URL is requested on the custom site 30, system 10 checks to see if the URL is a clip. If the URL is not a clip, system 10 checks for a scrub code for the domain of the URL. If the page has not been clipped or scrubbed, it will open in a new browser window. As the page is rendered, when links within the target are encountered, they are checked against the link behavior list and rendered appropriately (swapped or new window).

Encrypted Secure Sockets Layer (SSL) sessions may be required by the external sites 35 containing clipped pages (i.e., a credit card application). These SSL sessions are managed by system 10. In general, clipped SSL pages generate a cookie, which is passed to system 10 and managed while that page is being used in the custom website 15. These cookies are passed back to the originating site 35 when the page is exited by the user (i.e., when a credit card application is submitted).

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

I claim:

1. A method for incorporating content on a web page comprising:
    storing a list of at least one proscribed Uniform Resource Locators (URLs) and a corresponding alternative URL, wherein the corresponding URL contains an alternative set of information to the proscribed URL;
    identifying the content on a different web page, the content containing the at least one proscribed URL;
    describing a structure of the content on the different web page;
    storing the described structure;
    retrieving the identified content from the different web page in real time;
    comparing a structure of the retrieved content to the stored structure;
    incorporating the retrieved content on the web page, utilizing a nested web page, only if the structure of the retrieved content matches the stored structure; and
    trapping a request for the at least one proscribed URL and redirecting the request to the corresponding alternative URL if the at least one proscribed URL is selected.

2. The method according to claim 1, wherein if the structure of the retrieved content does not match the stored structure, the method further comprising:
    generating a new window; and
    displaying the retrieved content in a new window.

3. The method according to claim 2, further comprising: sending an alert to an administrator indicating that the structure of the retrieved content does not match the stored structure.

4. The method according to claim 3, further comprising:
    re-describing the structure of the retrieved content; and
    storing the re-described structure.

5. The method according to claim 1, wherein the step of identifying the content further comprises: identifying the content by tags.

6. The method according to claim 1, wherein the step of incorporating the content further comprises: rendering the content in a look and feel of the web page.

7. A method for incorporating content on a web page comprising:
    identifying the content on a web site not containing the web page, wherein the identifying includes a user interface through which a user selects portions of the content on the web site, and the user interface includes input fields to name and organize the selected portions, and preset menu to select the portions;
    describing a structure of the content;
    storing the described structure;
    retrieving different content from the web site in real time;
    comparing a structure of the retrieved different content to the stored structure; and
    incorporating the retrieved different content on the web page by utilizing a nested web page only if the structure of the retrieved different content matches the stored structure; and
    wherein if the structure of the retrieved different content does not match the stored Structure, the method further comprising performing an action in response to the difference, where the action is pre-selected by the user through the user interface, and the user interface includes a choice of actions including:
    generating a new window; and
    displaying the retrieved different content in a new window.

8. The method according to claim 7, further comprising: sending an alert to an administrator indicating that the structure of the retrieved different content does not match the stored structure, wherein the alert prompts the administrator to use the user interface to re-select the portions of the content on the web site.

9. The method according to claim 8, further comprising:
    describing the structure of the retrieved different content; and storing the described structure of the retrieved different content.

10. The method according to claim 7, wherein the step of identifying the content further comprises: identifying the content by tags.

11. The method according to claim 7, wherein the step of incorporating the content further comprises: rendering the content in a look and feel of the web page.

12. A method for incorporating content on a web page comprising:
    storing a list of at least one proscribed Uniform Resource Locators (URLs) and a corresponding alternative URL, wherein the corresponding URL contains an alternative set of information to the proscribed URL;
    identifying the content on a different web page, the content containing the at least one proscribed URL;

retrieving the content from the different web page in real time; performing processing to ensure that the structure of the retrieved content has retained integrity;

incorporating the retrieved content on the web page by utilizing a nested web page; and trapping a request for the at least one proscribed URL and redirecting the request to the corresponding alternative URL if the at least one proscribed URL is selected.

13. The method according to claim 12, further comprising: storing a plurality of proscribed URLs and corresponding alternative URLs; and redirecting to a corresponding alternative URL whenever a proscribed URL is selected.

14. The method according to claim 12, further comprising: storing a second proscribed URL without a corresponding alternative URL; and redirecting to the proscribed URL in a new window if the proscribed URL is selected.

15. The method according to claim 12, wherein the web page is customized for a particular user, wherein proscribed URL contains information not customized for the user and wherein the corresponding alternative URL contains information customized for the user.

16. The method according to claim 15, wherein information on the proscribed URL is inconsistent with information on the corresponding alternative URL.

17. The method according to claim 15, wherein corresponding alternative URL contains customized pricing information.

18. A method for incorporating content on a web page comprising:

storing a list of at least one proscribed Uniform Resource Locators (URLs) and a corresponding alternative URL, wherein the corresponding URL contains an alternative set of information to the proscribed URL;

identifying first content on a different web page, the content containing the at least one proscribed URL, wherein the identifying includes a user interface through which a user selects portions of the content on the web site;

identifying second content on a web site not containing the web page;

describing a structure of the first content, the structure being denoted as a first structure;

describing a structure of the second content, the structure being denoted as a second structure; storing the first and second structures;

retrieving the first content from the different webpage in real time; comparing a structure of the retrieved first content to the stored first structure;

incorporating the retrieved first content on the web page by utilizing a first nested web page upon determining that the structure of the retrieved content matches the stored structure;

trapping a request for the at least one proscribed URL and redirecting the request to the corresponding alternative URL if the at least one proscribed URL is selected;

retrieving second content from the website in real time; comparing a structure of the retrieved second content to the stored second structure; and incorporating the retrieved second content on the web page by utilizing a second nested web page upon determining that the structure of the retrieved second content matches the stored second structure.

19. The method according to claim 18, further comprising: establishing a secure session with the web site.

20. A method for incorporating content on a web page comprising: identifying first content on a different web page;

identifying second content on a web site not containing the web page;

describing a structure of the first content, the structure being denoted as a first structure;

describing a structure of the second content, the structure being denoted as a second structure; storing the first and second structures;

storing a list of at least one proscribed Uniform Resource Locators (URLs) and a corresponding alternative URL, wherein the corresponding URL contains an alternative set of information to the proscribed URL;

retrieving the first content from the different webpage in real time;

comparing a structure of the retrieved first content to the stored first structure;

performing processing to ensure that the structure of the first retrieved content has retained integrity;

incorporating the retrieved first content on the web page by utilizing a first nested web page only if the structure of the retrieved content matches the stored structure;

retrieving second content from the website in real time;

comparing a structure of the retrieved second content to the stored second structure;

performing processing to ensure that the structure of the second retrieved content has retained integrity;

incorporating the retrieved second content on the web page by utilizing a second nested web page only if the structure of the retrieved second content matches the stored second structure; and trapping a request for the at least one proscribed URL and redirecting the request to the corresponding alternative URL if the at least one proscribed URL is selected from either the incorporated first content or the incorporated second content.

* * * * *